United States Patent [19]
Lööf

[11] 3,739,822
[45] June 19, 1973

[54] WOOD-TURNING MACHINE
[76] Inventor: Nils Oskar Tore Lööf, S-540 72 Gullspant, Sweden
[22] Filed: Nov. 9, 1970
[21] Appl. No.: 87,936

[30] Foreign Application Priority Data
Sept. 8, 1970 Sweden............................ 12201/70

[52] U.S. Cl........................................ 142/1, 82/12
[51] Int. Cl................................................ B23b 5/40
[58] Field of Search.................. 82/12, 34; 142/1; 144/33; 29/106; 90/11 DB; 408/57, 59

[56] References Cited
UNITED STATES PATENTS
| 1,519,344 | 12/1924 | Allemeier | 144/33 |
| 3,064,510 | 11/1962 | Floyd | 82/12 |
| 3,298,405 | 1/1967 | Loof | 142/1 |
| 3,528,326 | 9/1970 | Kilmgr et al. | 82/12 X |

FOREIGN PATENTS OR APPLICATIONS
| 421,552 | 11/1925 | Germany | 82/12 |
| 71,345 | 12/1946 | Norway | 408/57 |

Primary Examiner—Leonidas Vlachos
Attorney—Fred C. Philpitt

[57] ABSTRACT

A machine to facilitate the production of hollow bodies of two co-axial rotational surfaces. A tool holder in the shape of a spherical segment carries an easily replaceable cutting tool. The tool holder is capable of linear movement in three directions and is also rotatable about an axis perpendicular to the rotation axis of the workpiece. The tool holder is itself easily replaceable to facilitate the fabrication of bodies whose surfaces have different radii of curvature.

2 Claims, 7 Drawing Figures

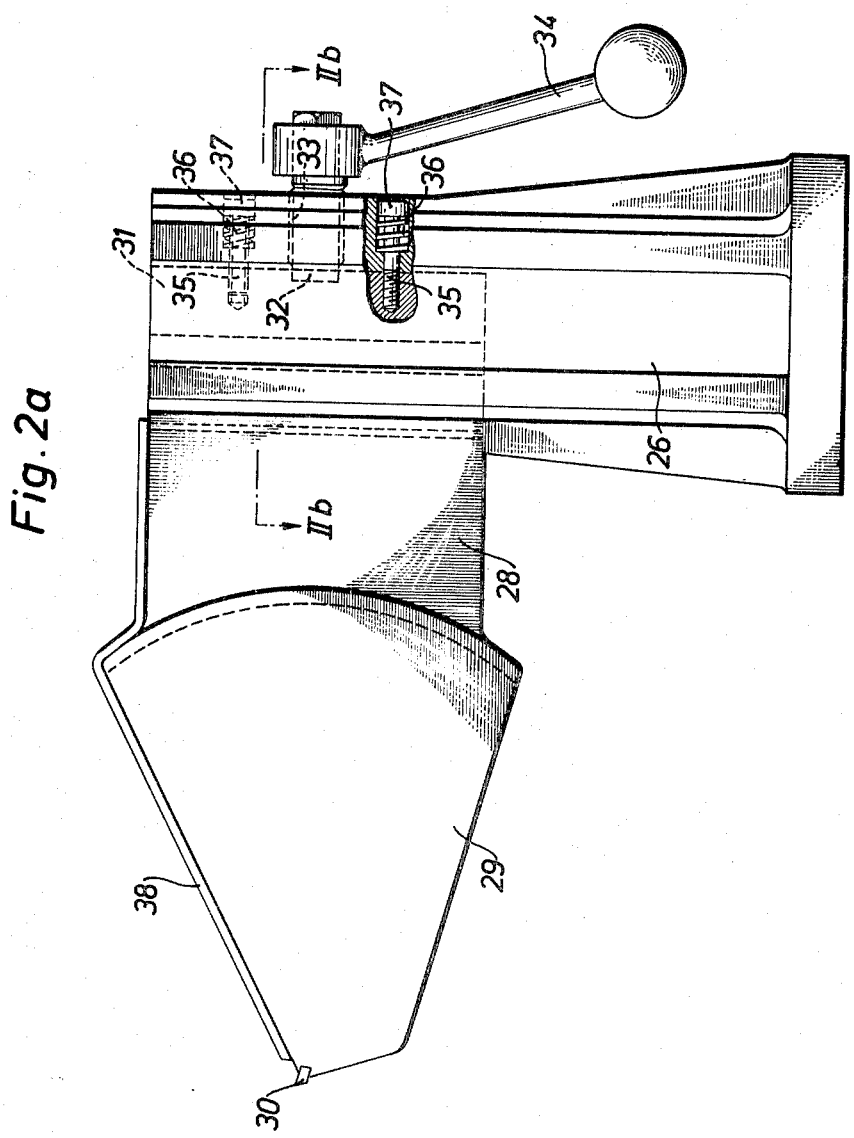

WOOD-TURNING MACHINE

BACKGROUND OF THE INVENTION

My U.S. Pat. No. 3,298,405 describes a method and a machine for manufacturing a plurality of hollow bodies from a solid block of wood. This device includes a pivot and link means for imparting movement along a circular arc to the cutting tool of the machine.

In pursuing practical development of machines of the type related to my U.S. Pat. No. 3,298,405 it has been discovered that the tool holder disclosed is a limited utility in satisfying the requirements of a high manufacturing rate. The basic problem is old in the art of working wood and has been attacked in various ways. The difficulties encountered are caused by the high mechanical loads which are applied to the cutting tool and its holder. Previous attempts to reduce the stresses have resulted in machines with a plurality of cutting tools mounted in spaced relationship in the direction of the circumferential groove cut in the workpiece. However, this design, in which the tools may be thought of as a number of successive teeth, does not adequately solve the problem since, in practice, the actual cutting operation is performed by only the forwardmost tool.

The main object of the present invention is to provide a machine, preferably a wood lathe, for manufacturing products comprised of spherical limiting surfaces, such as bowls, plates, trays, and lamp shades, which will satisfy the above-mentioned requirements and at the same time substantially increase its output. In order to illustrate the practical significance of the advantages of the present invention it should be noted that tests carried out with a machine in accordance with the principles of the present invention have shown it is possible to reduce the production time for manufacturing spherical wooden bowls to the order of 1/10 of the time required using previously known principles of design. The lathe arranged according to the present invention has a tool holder which is, in part, shaped as a spherical segment and carries a tool, which preferably is easily replaceable.

One embodiment of the present invention will now be described in greater detail, reference being made to the accompanying drawings in which:

FIG. 2a is a side elevation showing the tool holder and its mounting;

FIG. 2b is a horizontal section taken along the line IIb—IIb in FIG. 2a;

Figure 1:
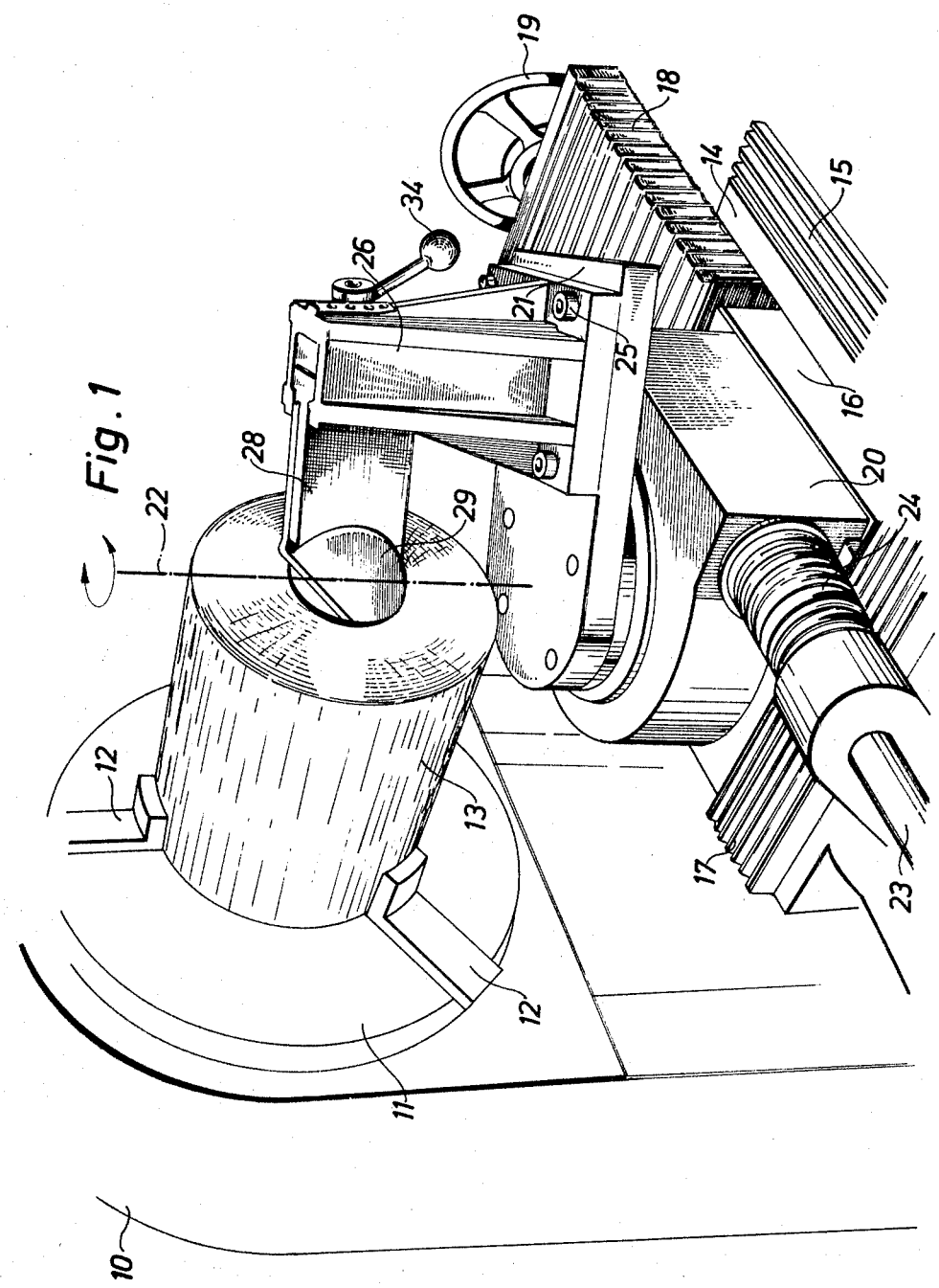
FIG. 1 is a perspective view illustrating the elements of the machine forming part of the invention.

Reference numeral 10 designates a portion of the framework of a lathe designed in accordance with the principles of the present invention and provided with a chuck 11 having three jaws 12 which between them grip a cylindrical workpiece 13, According to the embodiment illustrated, the workpiece comprises a wooden block. Preferably a chuck comprising an annular disk is secured to a rearwardly extending tube which is supported in the framework 10 by means of two heavy needle bearings and at its free end has a suitable driving means, such as a V-belt pulley. When the chuck is designed in this manner the lathe can be used for woodworking on continuous material such as logs of a maximum diameter of about 10 inches. With this arrangement preferably a rear support for the chuck should be provided for further support of the log. Although the workpiece does generally have a circular cross-section, this is by no means a requirement in that it is possible to carry out the invention with workpieces of differing cross-section. For instance, workpieces of a square cross-section can be utilized. In this case a particular advantage is that the turning operations are performed concentrically beginning relatively close to the axis of rotation. Succeeding cuts are made at successively increasing radial distances from the rotational axis. This is opposite to the conventional displacement of a cutting tool in a turning operation.

The invention can be utilized for working a wide variety of materials but inasmuch as the inherent advantages of the invention are most pronounced in woodworking, the workpiece will, in the remainder of the disclosure, be presumed to consist of wood. One of the major advantages of the machine designed in accordance with the principles of the present invention is its capability for use in turning wood from differing sources and qualities. This is due to the fact that it is capable of yielding substantially equivalent products independently of the hardness and moisture content of the workpiece. Practical tests have shown that the only modifications necessary in changing from one type of workpiece to another is that of changing the cutting tool to one having a different cutting and release angle.

The portion of the framework of the machine located in front of the workpiece comprises a vertically movable work table which is provided, in a conventional manner, with a longitudinally displaceable carriage 14. This is driven by means of a feeding spindle mounted inside a protective bellows 15 and controlled by means of a wheel, not shown. The carriage 14 is therefore movable parallel to the direction of the axis of rotation of the chuck. A cross-slide 16 is mounted on top of the carriage 14. The cross-slide 16 has an internally threaded portion engaged with a threaded spindle surrounded by bellows 17 and 18 to protect it from dust and chips. Its one end is axially undisplaceable but rotatably mounted and the opposite end carries a wheel 19. Above the cross-slide 16 a gear housing 20 is mounted which supports a tool support. The tool support is generally U-shaped and located in a vertical plane with its two legs horizontal. The lower leg comprises a horizontal plate 21 which is mounted on a shaft located inside gear housing 20 and carries a worm wheel in engagement with a worm screw. The dash-dotted line 22 extends upwardly from the shaft and locates it with respect to horizontal plate 21. The arrow symbol indicates that the tool support is capable of carrying out a reciprocating swinging movement. This movement is imparted to the tool support via the worm gear, being driven by the worm screw which is rotatably driven by means of shaft 23 passing through a sealing sleeve 24 and in turn driven by a variator. Since the variator and its associated driving equipment are known and do not form any part of the present invention the details of this apparatus have not been shown.

Figure 2:
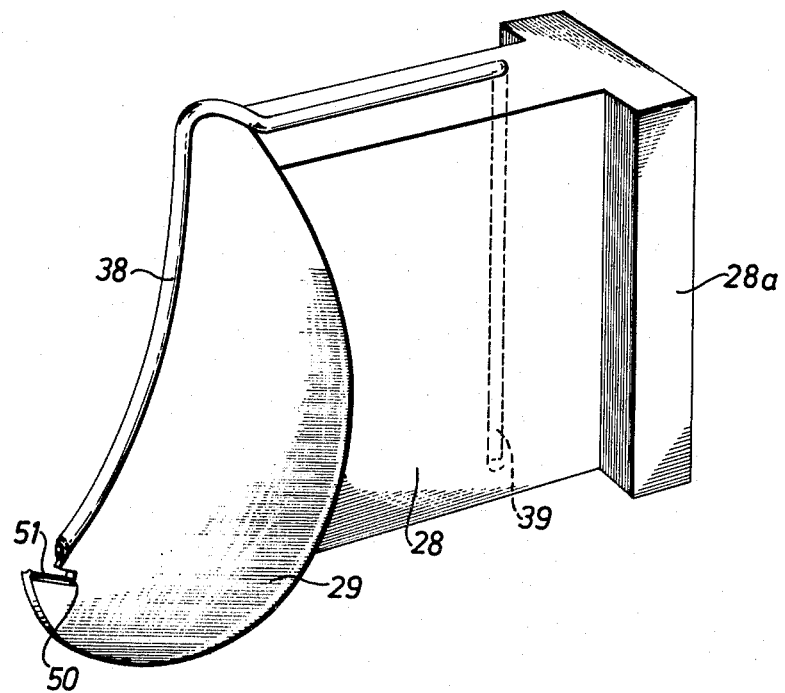
FIG. 2 is a perspective view showing the tool holder used in FIG. 1.
Figure 3:
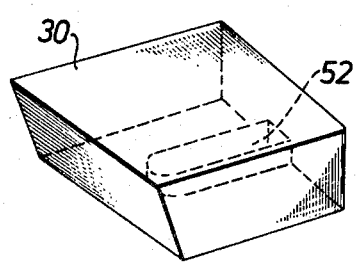
FIG. 3 shows on a larger scale the cutting tool.
Figure 2B:
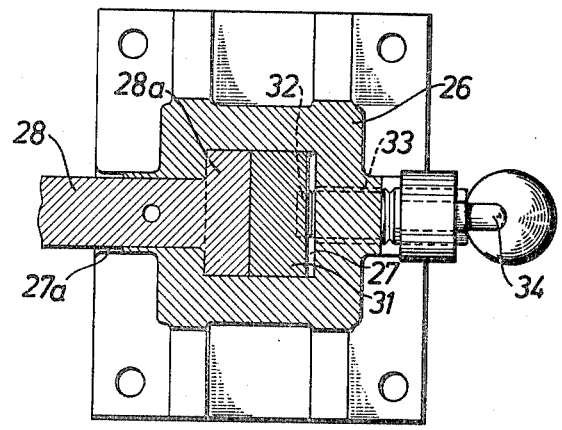
Figure 4:
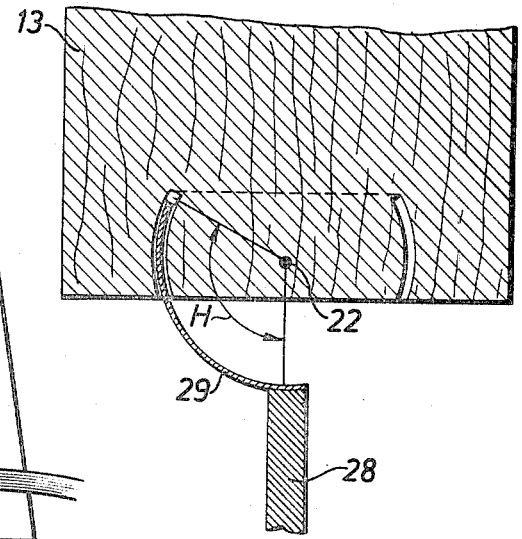
FIG. 4 is a diagrammatic, horizontal-section showing a workpiece and the groove created therein by the tool.

At the end of the lower leg of the tool support, opposite the rotational axis 22, an upright 26 is mounted by means of bolts 25. The upright 26 has a central passage 27 of rectangular cross-section and contains, in one lateral wall, a vertical groove 27a. A vertically oriented plate 28, which has a yoke 28a on one end thereof, is capable of movement in the vertical groove 27a. The unit comprising members 28 and 28a has a T-shaped horizontal cross-section and forms the rear portion of the tool holder. The front portion of the tool holder comprises a spherical segment 29 secured to the front end of plate 28. The tool proper, designated as 30, is carried by spherical segment 29 as shown in FIGS. 2, 3 and 4. The shape of the segment 29 and the underlying technical considerations are discussed below. A vertical clamping member 31 is housed within passage 27 behind the yoke 28a. The clamping member 31 is horizontally displaceable by screw 32 which fits into a corresponding recess in member 31. The central portion 33 of the screw 32 threadably engages the rear wall of the upright 26 and the rear end of screw 32 carries a control lever 34. During horizontal movement member 31 is guided by two vertically spaced horizontal bolts 35, shown in FIG. 2a, which engage member 31. Each bolt 35 is surrounded by a pressure spring 36 located in a corresponding recess of upright 26. Each of the springs 36 is located between the inner end of the recess and the inner side of bolt head 37 to maintain the clamping member 31 in its rearmost position facilitating convenient insertion and withdrawal of tool holder yoke 28a into passage 27 when the control lever 34 is in its released position.

Figure 5:
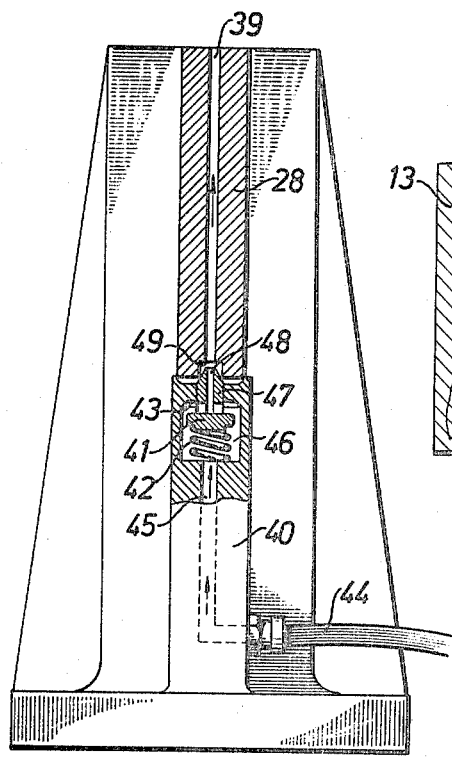
FIG. 5 is a part-sectional, lateral view showing a valve arrangement for supplying pressurized air to the tool.

As shown in FIGS. 2 and 2a there is a pipe 38 secured to the upper edge of spherical segment 29 which has an open end adjacent cutting tool 30. In operation pressurized air is supplied through this pipe and delivered at the tool for cooling and chip removal. The rear end of the pipe is connected to a vertical bore 39 in plate 28. FIG. 5 illustrates valve 40 which supplies pressurized air to bore 39. Valve 40 is located in the upright 26 with disk-shaped valve member 41 which is urged into contact with valve seat 43 by pressure spring 42. When the spring moves the valve member 41 into contact with valve seat 43 the valve is closed. Pressurized air is supplied from a suitable source to a hose 44 and thence to a passage 45 into the valve chamber 46 of the valve 40. A pin 47, which is axially displaceable, protrudes from the upper portion of the valve chamber 46 through a hole. The pin 47 is provided with a close fit for the necessary sealing. The lower end of the pin 47 is secured to valve member 41 and the protruding upward end of the pin 47 is tapered. Radial orifices in the lower end of pin 47 communicate with the valve chamber 46 when the valve 47 is open. The radial orifices in the lower end of the pin communicate with a central passage 48 in the pin which is capable of communicating with the bore 39 in plate 28.

When the tool holder is not mounted in the upright 26 the valve 40 is closed. When the tool holder is inserted into the upright, that is yoke 28a is inserted in central passage 27 and urged downward, the upper portion of pin 47, being tapered, will be guided into the corresponding recess 49. During the last portion of the downward movement the yoke 28a will force the pin 47 down against the force of spring 42. Thus the valve 40 is open when the tool holder is properly inserted and provides a fully automatic quickly made pressurized air connection.

FIGS. 2 and 3 show the relationship of the cutting tool and the tool holder. The front portion of the tool holder, spherical segment 29, has a seat for the cutting tool in the form of a notched recess 50. The bottom surface of the notch has a ridge 51 which can be brought into engagement with a corresponding groove in the cutting tool 52, after which the tool is secured to the tool holder, preferably by brazing. Replacing a tool requires only a minimum amount of local heating. The notched recess, ridge, and groove automatically orient the tool properly, obviating the need for measurement or matching. This results in a quickly replaceable tool which is also low in cost since the tool itself, which is high-quality and relatively expensive, is also relatively small.

FIG. 4 shows a horizontal section through the spherical segment 29 and the workpiece 13 and illustrates the shape and small width of the groove cut in the workpiece. The transverse dimension of the cutting tool exceeds the wall thickness of the tool holder by approximately 80 mils. One corresponding advantage of this arrangement is to reduce the mechanical stresses to which the tool and tool holder are subjected. In addition, the volume of wood cut away which comprises waste material is also reduced, which is important from the standpoint of manufacturing economy. FIG. 4 also illustrates that the axis 22, around which the spherical segment 29 revolves, passes through the center of the spherical segment. This axis is not located in the end wall of the workpiece but instead is located a small distance inside that surface. This location of the axis 22 results in the substantial advantage that a machine is provided which is capable of manufacturing hollow bodies with an opening angle which may exceed 180°.

The spherical segment 29 can be given substantial dimensions both in the direction of the axis 22 as well as in the horizontal plane in which swinging movement occurs. The last-mentioned angle, designated H in FIG. 4, corresponds to half the value of the opening angle of the groove which will be cut in the workpiece. The maximum theoretical value of the angle H is 120°, although in practice a slightly smaller value, approximately 115°, is used when it is desired to turn hollow bodies of maximum opening angle. This angle, which amounts to about 230°, substantially exceeds a 180° opening angle. The opening angle of about 230° is a maximum and as can be easily understood this angle may in many cases be made much smaller. From FIGS. 1 and 2 it is clear that the edge of the spherical segment 29 carrying the pressurized pipe 38 forms an angle of about 45° relative to the horizontal. This showing is merely illustrative and the angle can be varied within wide limits.

The lathe disclosed herein has two principle operating patterns. In one method of operation the same tool holder is used in several consecutive working operations. This results in the production of hollow bodies with two coaxial spherical surfaces, the radii of curvature of both of these surfaces being equal. In the other method of operation the tool holder is changed after each working operation. That is, each working operation utilizes a tool having a radius of curvature greater than the radius of curvature of the tool used in the previous working operation. The resulting products of this method of operation are hollow bodies with concentric spherical surfaces of differing radii of curvature.

As has been mentioned above the specification and drawings illustrate only a preferred embodiment. In addition to the spherical form of the tool holder several other components of the machine have been disclosed which contribute to the overall advantages possessed. The resulting machine has a high production rate in combination with a high finish of the ready turned surfaces and a high manufacturing economy. A further advantage is that any product cut from the workpiece is maintained in its proper position during the corresponding turning operation without the need of any external support.

I claim:

1. A machine for producing from a solid workpiece a plurality of hollow bodies each comprising two coaxial rotational surfaces, comprising
   a. a base,
   b. means located on said base for holding a workpiece for rotational movement,
   c. a tool holder including a portion shaped as a spherical segment,
   d. said spherical segment supporting a cutting tool,
   e. means for rotating said cutting tool about a rotational axis, said rotational axis being located behind the workpiece surface facing said tool holder, and said rotational axis also being perpendicular to the axis of rotation of said workpiece, and
   f. a pipe located adjacent one edge of said tool holder for supplying pressurized air to said tool for cooling and chip removal,
   g. said tool holder being supported by means including a valve for communicating with said pipe, said valve automatically opening upon the insertion of said tool holder in said last-named means.

2. In the machine according to claim 1 in which said tool holder has, opposite the end of said spherical segment, a yoke, T-shaped in cross-section, to enable said tool holder to be clamped in a fixed position.

* * * * *

UNITED STATES PATENT OFFICE
CERTIFICATE OF CORRECTION

Patent No. 3,739,822          Dated June 19, 1973

Inventor(s) NILS OSKAR TORE LOOF

It is certified that error appears in the above-identified patent and that said Letters Patent are hereby corrected as shown below:

Applicant's address <u>is Gullspang, Sweden</u> not Gullspant, Sweden

Signed and sealed this 9th day of July 1974.

(SEAL)
Attest:

McCOY M. GIBSON, JR.
Attesting Officer

C. MARSHALL DANN
Commissioner of Patents